Aug. 18, 1936.  E. J. KINGSBURY  2,051,720

COMPOSITE MACHINE TOOL FOR MULTIPLE OPERATIONS

Filed April 11, 1935  6 Sheets-Sheet 1

Inventor:
Edward J. Kingsbury,
by
Attys.

Aug. 18, 1936.  E. J. KINGSBURY  2,051,720
COMPOSITE MACHINE TOOL FOR MULTIPLE OPERATIONS
Filed April 11, 1935   6 Sheets-Sheet 2

Inventor:
Edward J. Kingsbury,
by Mason Porter
Att'ys.

Aug. 18, 1936.   E. J. KINGSBURY   2,051,720
COMPOSITE MACHINE TOOL FOR MULTIPLE OPERATIONS
Filed April 11, 1935   6 Sheets-Sheet 3

Inventor:
Edward J. Kingsbury,
by Mason Norton,
Att'ys.

Aug. 18, 1936.    E. J. KINGSBURY    2,051,720
COMPOSITE MACHINE TOOL FOR MULTIPLE OPERATIONS
Filed April 11, 1935    6 Sheets-Sheet 4

Inventor:
Edward J. Kingsbury,
by Mason
Att'ys.

Aug. 18, 1936. E. J. KINGSBURY 2,051,720
COMPOSITE MACHINE TOOL FOR MULTIPLE OPERATIONS
Filed April 11, 1935 6 Sheets-Sheet 5

Inventor:
Edward J. Kingsbury,
by Mason… Att'ys.

Aug. 18, 1936.    E. J. KINGSBURY    2,051,720
COMPOSITE MACHINE TOOL FOR MULTIPLE OPERATIONS
Filed April 11, 1935     6 Sheets-Sheet 6

Inventor:
Edward J. Kingsbury,
by Mason Torrey
Att'ys.

Patented Aug. 18, 1936

2,051,720

UNITED STATES PATENT OFFICE 2,051,720

COMPOSITE MACHINE TOOL FOR MULTIPLE OPERATIONS

Edward Joslin Kingsbury, Keene, N. H.

Application April 11, 1935, Serial No. 15,887

6 Claims. (Cl. 29—26)

This invention relates to improvements in machine tools and is more particularly concerned with a composite machine tool including parts for performing several operations upon a single article of work.

One of the features of the present invention is the provision of a machine tool of this nature comprising a plurality of tool devices for performing successive operations upon an article of work, by the presentation of this article of work successively to the several devices, and including selecting means for controlling the sequential energization of each tool device so that the tool devices are brought into operation only when the work has been properly prepared and presented.

Another feature of the invention is the provision of a machine tool including a plurality of tool devices for successive operation upon an article of work which is to be fabricated by performing like operations thereon at several points, with the inclusion of mechanical means for successively presenting the article for a series of operations by the tool devices, and including selectively actuated means for releasing or producing the energization of the tool devices in such an order that each device is brought into activity only when the work has been properly prepared and presented for the operation of said corresponding tool device, and whereby no tool device is permitted to operate twice upon the same point of the article of work.

A further feature of the invention is the provision of a composite machine tool including a plurality of tool devices for successive operations upon an article of work which requires a plurality of operations thereon at points having uniform peripheral spacings from one another, together with power means for revolving the work successively through an angle equivalent to the peripheral spacing, the tool devices being located at corresponding angles from one another with respect to the axis about which the article of work is rotated or indexed, together with selective releasing means for effecting the energization of the tool devices in proper order for the successive preparation and completion of the article of work by one operation being performed thereon at each tool device, the tool devices being released only when the article of work has been properly prepared and presented thereto, and being held against release when a portion of the article of work is presented thereto which has already been treated at such tool device.

With these and other objects in view, as will appear in the course of the following specification and claims, an illustrative form of practicing the invention is set out on the accompanying drawings, in which:

In these drawings, the common base B is provided with appropriate slideways on its surface for receiving a plurality of tool devices or working units WI, W2, W3, W4, each of which is illustrated as a drilling machine including at least one spindle WS which is rotated, and each also including a feeding mechanism for advancing and retracting the spindle. The feed mechanism of each tool device includes a feed restraining means which operates to detain the corresponding spindle in its withdrawn position until released by a suitable element, such being diagrammatically illustrated at WR1, WR2, WR3, WR4 in Fig. 2. Likewise, each tool device or working unit includes a valve WV1, WV2, WV3, WV4 which is closed while the work spindle is out of its retracted position, but is opened as the spindle returns to retracted position, as will be more particularly described with respect to Fig. 4.

In the conduit system shown in Fig. 2, a source of fluid under pressure includes a conduit 10 which has two branches, one of which extends by the sections 11 through the tool device valves WV1, WV2, WV3, WV4 and by the conduit section 12 to the manually operable valve HV and the automatically operable valve AV, the further passage from these valves being accomplished by the conduit 13 to the work rotating mechanism, as will be described hereinafter. The other branch from the supply conduit 10 extends by a conduit 14 to the trip valve TV and thence by conduit 15 for parallel connection with the automatic valves AW1, AW3, AW4, these valves being more particularly shown in Figs. 2 and 6. From the valve AW1, a conduit 16 leads to the two release means WR1 and WR2, these means operating to release the tool devices W1 and W2 simultaneously, as the operation effected by the tool device W2 does not require the prior operation of device W1, as will be pointed out hereinafter. The valve AW3 is connected by a conduit 17 with the release device WR3 or tool device W3. The valve AW4 is connected by a conduit 18 with the release device WR4 or tool device W4.

The work rotating or indexing structure and associated parts resemble those set out in the Kingsbury and Swahnberg Patent 1,975,005, granted September 25, 1934, to which reference may be made for further details of the assemblage.

This structure comprises a driven shaft 20 which is driven in one direction by a suitable source of power so long as fluid pressure is present in the conduit 13. One form of the means for accomplishing this is illustrated in the aforesaid Kingsbury and Swahnberg Patent 1,975,005. So long as the shaft 20 is rotated, the head 21 is turned therewith so that the roller 22 is caused to engage with the walls of slots present in the lower surface of the revoluble plate 23, and this plate 23 is carried in rotation with its shaft 24. The shaft 24 is supported by anti-friction bearings 25 with respect to the general housing H (supported on the base B) and the cover plate K of the work holder. The upper end of the shaft 24 is bored out to receive the stem 26 of the work receiving pin having a portion 27 provided with grooves and lands to fit the central hole of the illustrated article of work. This pin terminates in a cylindrical reduced portion 28 having one face cut away to provide a flat 29 spaced from the inner wall of the work clamping knob 30 which is provided with a pin 31 for engagement with this flat surface 29. The pin 26 is secured in position by a screw 32 passing through the upper end of the shaft 24 and also passing through a cap member 33 which is thus caused to rotate with the shaft 24. This cap member has a downwardly extending peripheral skirt for overlapping an upwardly extending peripheral flange on the cover K to prevent chips, coolant, etc., from gaining access to the interior of the work support housing H. The upper surface of the member 33 receives a plate 34 which itself is keyed to the pin 26, and is held fast by the screws 35 and is provided with supporting screws having their heads extending above the upper surface of the plate and providing locating abutments for determining the distance by which the article of work X (Fig. 3) may be slid downward over the pin 26.

Figure 5:
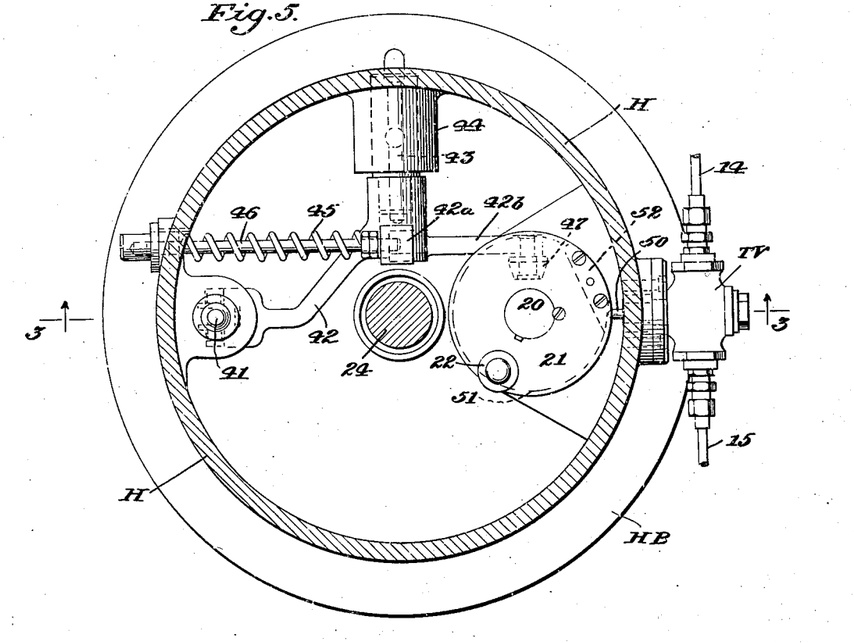
Figure 5 is a horizontal section substantially on line 5—5 of Fig. 3.

The revoluble plate 23 is provided also with the locating bushings 40 which correspond in number to the number of points about the axis of the article of work at which the tooling operations are to be performed, and hence in the illustrated example six such devices are provided at equiangular spacing as six such operations are to be performed at equiangular positions about the article of work. A latching or locating pin 41 engages in a locating bushing 40 to hold the article of work against movement while the tool device is operating. For this purpose, the pin 41 is moved upwardly by the action of a crank lever 42 which is mounted by a pivot 43 (Fig. 5) on an internal boss 44 of the housing H. A compression spring 45 is guided by a rod 46 and exerts its thrust against an upwardly projecting arm 42a of the lever 42, while an arm 42b of this lever carries a roller 47 which rests upon a cam 48 keyed to the upper end of the shaft 20 (Figs. 3 and 5), so that the pin 41 is moved downwardly out of the bushing 40 when the shaft 20 first begins to turn, thereby freeing the shaft 24 and its associated parts from drag. When the plate 23 approaches the next position, the cam 48 releases the lever 42 and the pin 41 is forced upward again by the spring 45 and thus serves for properly locating the work at the new position.

The head 21 is likewise constructed as a cam for actuating the stem 50 of the trip valve TV, being cut away as at 51 for the greatest part of its periphery and being provided with an inset hardened steel cam piece 52 for accurately moving and holding the stem 50 in the open position of the valve so long as the work support is holding the work quiescent at a given position or station for the operation of the tool devices.

Figure 8:
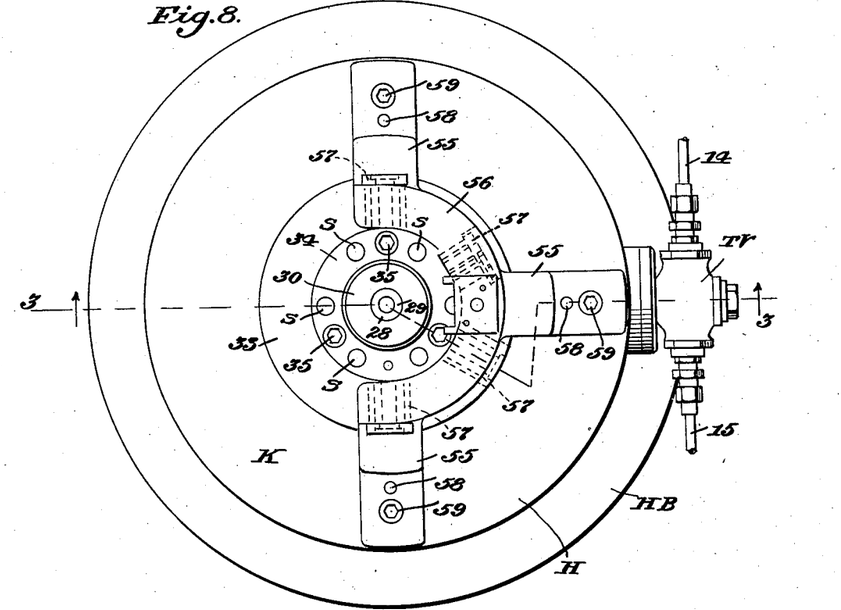
Figure 8 is a top plan view of the work holder.

The cover K of the work support is provided with three upwardly extending legs 55 which are joined at their tops by a semicircular half-ring 56 provided with the usual fixture bushings 57 (Figs. 3 and 8) for properly guiding the tools of the work spindles WS. These legs 55 are themselves located by pins 58 which fit in corresponding holes in the cover K and by the cap screws 59.

Figure 3:
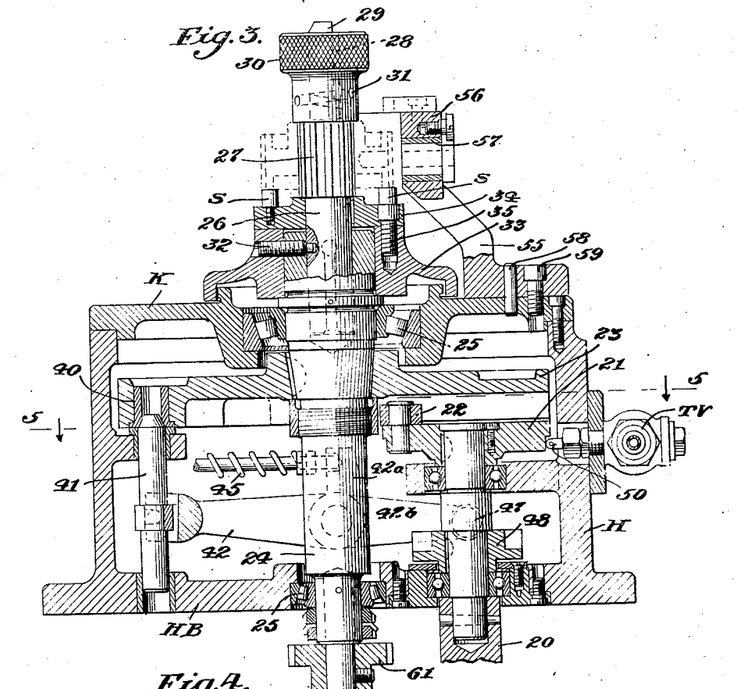
Figure 3 is an upright sectional view on a larger scale, substantially on line 3—3 of Fig. 5, showing the work holder and the means for rotating or indexing the same.
Figures 6, 7:
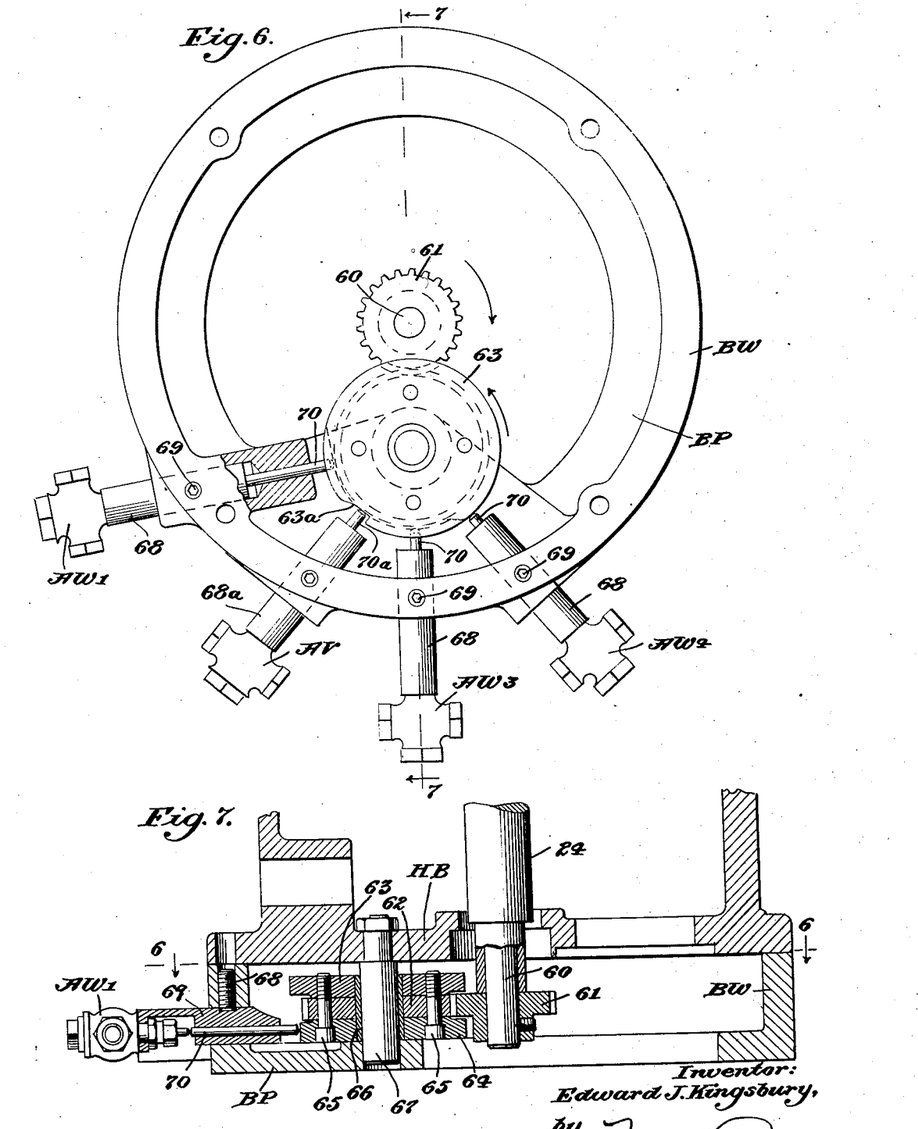
Figure 6 is a horizontal section substantially on line 6—6 of Fig. 7.
Figure 7 is an upright sectional view substantially on line 7—7 of Fig. 6.

The shaft 24 of the work support is provided at its lower end with a pin 60 which has a pinion 61 fixed thereto (Figs. 3, 6, and 7). This pinion 61 is in mesh with a gear 62 to which are fixed two cam plates 63 and 64, the three parts being clamped together by cap screws 65 and supported on a bearing bushing 66 surrounding a pin 67 which is held in the bottom wall HB of the housing H, and in the auxiliary bottom plate BP (Fig. 7). This bottom plate BP has a skirt wall BW which is provided with three support pieces 68 which are held fixedly positioned by corresponding locking screws 69, and each of which serves to support and guide a pin 70 and to support a valve AW1, AW3 or AW4 in proper position so that the actuation of the corresponding pin 70 by the cam plate 64 will produce a movement in the corresponding valves AW1, AW3 or AW4. Likewise, the wall BW is provided with a member 68a for supporting and guiding a pin 70a and the valve AV, the pin 70a being presented opposite the cam plate 63.

Figure 11:
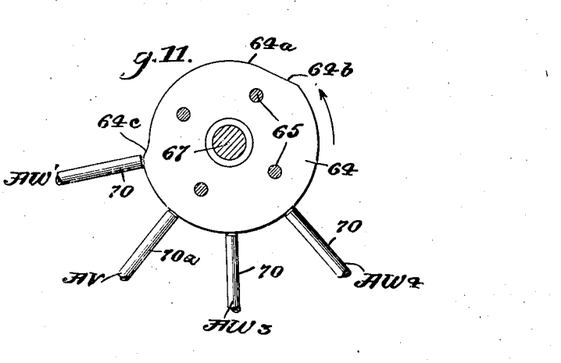
Figure 11 is a diagrammatic showing of one of the cam plates in association with the corresponding valve actuating pins.

As shown in Fig. 6, the cam plate 63 has a single notch 63a in its periphery which in the position shown (Fig. 6) has permitted the pin 70a to move inward and the corresponding valve AV to close. The cam plate 64 (Figs. 6 and 11) is circular and larger for the major portion of its periphery, but has also a circular portion 64a of smaller radius joined to the larger circular portion by a gradual transition 64b at one end and a more abrupt transition 64c at the other end.

Figure 4:
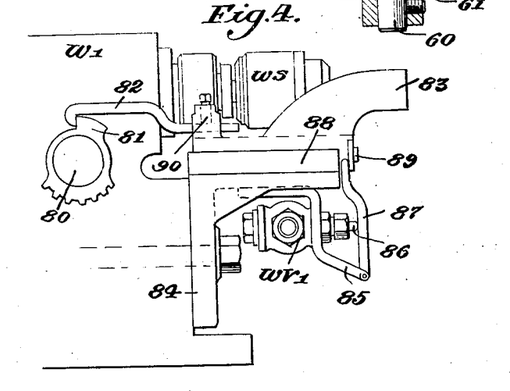
Figure 4 is a fragmentary view, showing a portion of one of the work devices, together with the means associated therewith for releasing a portion of the interlocking system.

Each of the tool devices or working units W1, W2, W3, W4 is provided with feeding means which operates automatically when released by the devices WR1, WR2, WR3, WR4 respectively to cause a forward movement and then a withdrawing movement back to retracted position. This feeding means is illustrated in Fig. 4 as including a shaft 80 which moves proportionally to the movement of the corresponding work spindle WS, and has thereon a finger piece 81 for engaging with an operating member 82 which is fixed to the slide 83 carried on a bracket 84 attached to the working unit W1, thus illustrated. The bracket 84 also supports a secondary bracket 85 to which is fixed the supervising valve WV1 for the unit W1. The supervising valve WV1 has an operating stem 86. A lever 87 is pivoted at the lower end of the auxiliary bracket 85 and has its upper end engaged between the two projections 88 and 89 of the slide member 83. The clamping screw 90 holds the operating member 82 in the desired position of adjustment, so that the valve stem 84 is moved at the proper time with respect to the withdrawal of the work spindle WS.

Figure 9:
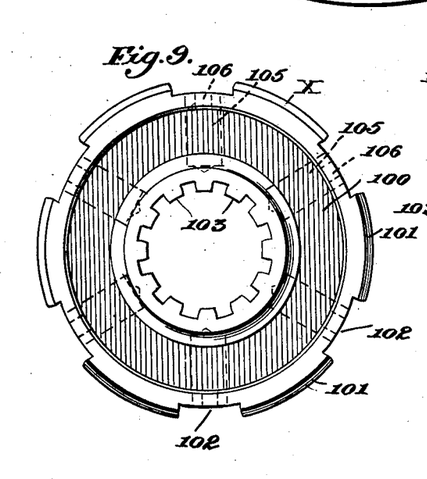
Figure 9 is an end view of the illustrative article of work, on a much larger scale.
Figure 10:
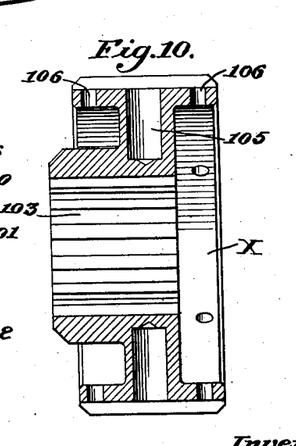
Figure 10 is a diametrical section thereof.

The illustrated assemblage is intended particularly for performing the necessary operations upon an article of work as illustrated in Figs. 9 and 10. This structure comprises a ring 100 having outwardly extending land portions 101 with depressions 102 therebetween. The interior of the ring is likewise provided with lands 103 which are separated by grooves. These lands 103 cooperate with lands provided on the portion 27 of the work pin 26, as described above. This illustrated article of work is to have like operations performed thereon at six positions which are equiangularly spaced about the periphery (Fig. 9), each operation comprising the formation of a large central hole 105 and two lateral holes 106. The central hole 105 is to be formed by drilling, rough-reaming, and finished-reaming operations.

The operation of the structure thus described for this illustrated article of work is as follows:

At the beginning of the cycle of operation, the working units or tool devices W1, W2, W3, W4 are each located with the corresponding spindles WS in fully withdrawn position, the feed detaining means being in its normal position of retaining these spindles, and the corresponding tools in such withdrawn or retracted position. The blank for the article of work is then placed over the work-receiving pin 26, with its lands interengaging with the lands on the portion 27 thereof. The cap 30 is placed in position. The article of work is now accurately positioned peripherally and held against rotative movement relative to the shaft 24 by the aforesaid interengagement of the lands. It is accurately located in height by resting upon the heads of the stop screws S and by the clamping action of the cap 30.

Figure 1:
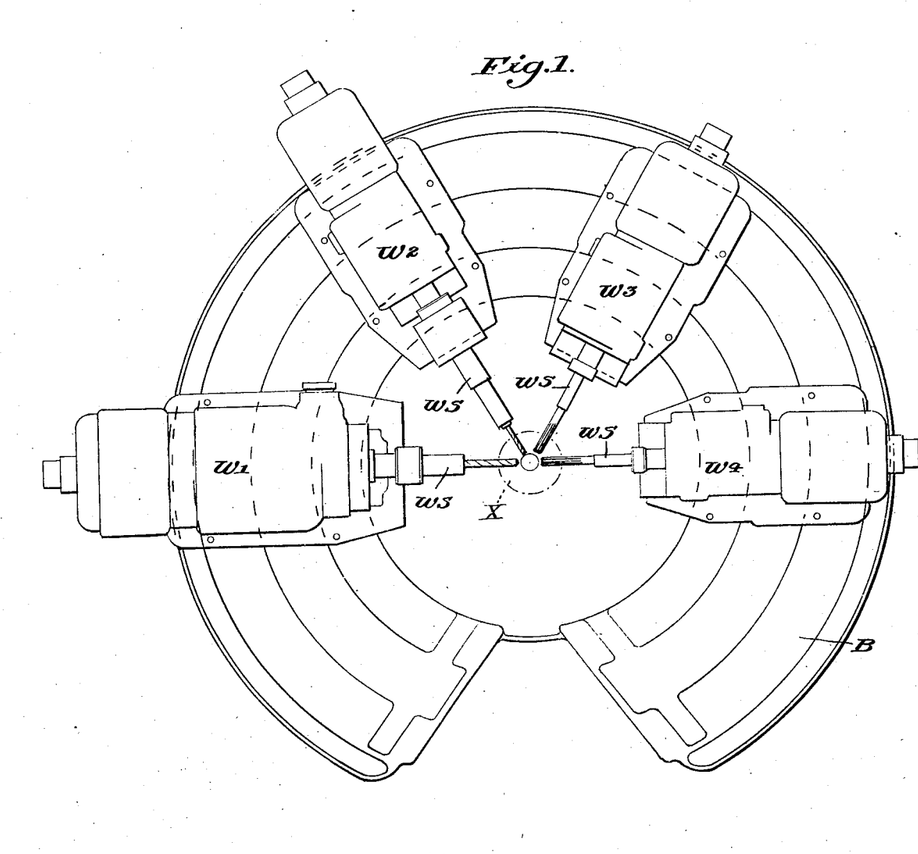
Figure 1 is a top plan view showing the arrangement of a plurality of tool devices for completing an article of work as shown in Figs. 9 and 10.
Figure 2:
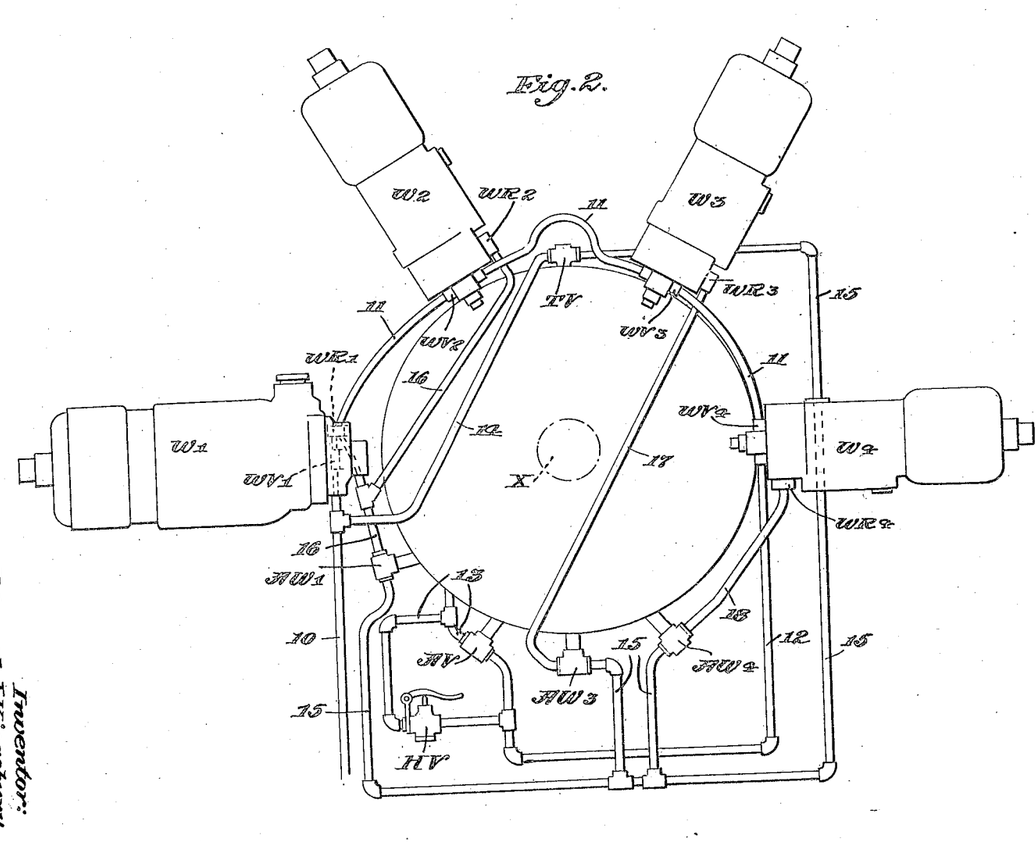
Figure 2 is a diagrammatic view corresponding to Fig. 1 but showing the piping system employed when the several elements are connected and interlocked by fluid pressure means.

When this operation of placing the blank in position has been performed, the attendant momentarily depresses the hand valve HV (Fig. 2). It will be noted that at this time (Fig. 6) the pin 70a is engaged in the notch 63a of cam 63, so that the automatic valve AV is closed. Hence the operation of the hand valve HV is in shunt to the automatic valve AV at this time. Fluid under pressure may now flow from supply conduit 10 through the open valves WV1, WV2, WV3, WV4 and the conduit sections 11 and 12, and through the hand valve HV and conduit 13 to the release device, so that the shaft 20 when energized effects rotative movement through a single revolution.

As the work support has been located at station by the engagement of the pin 41 in the proper bushing 40, and the shaft 20 has been held at a standstill, the plate 21 has been held properly positioned so that the trip valve TV is closed. The attempt of fluid to flow from the supply conduit 10 through the branch 14, trip valve TV, and conduit section 15 is prevented by the closed valves TV, AW1, AW3, AW4.

The energization of shaft 20 causes the cam piece 48 to rock the lever 42 and withdraw locating pin 41 from the bushing 40 and thereafter to move the plate 21 and its roller 22 into engagement with the walls of a slot in plate 23 so that the rotating plate 23 is moved through an angle of 60 degrees while the shaft 20 is completing its single revolution. The work X is turned with shaft 24. The valve TV remains closed for the major portion of the movement of shaft 20, and hence the supply of fluid medium to pipe 13 is cut off and an escape permitted, so that the valves AW1—AW4 are deprived of fluid pressure medium. Toward the end of a single revolution of shaft 20, the cam 52 opens the valve TV momentarily (Fig. 5), and thereafter permits this valve TV to close so that the flow is shut off again.

This partial revolution of the shaft 24 is accompanied by a rotation of the pinion 61 and therewith of the upper cam plate 63 in a counter-clockwise direction (Fig. 6), so that the notch 63a is removed from the indicated position opposite pin 70a and the valve AV is thereby opened.

The movement of the gear 62 also produces a movement of the lower cam plate 64 which causes a movement of the first pin 70 and thus an opening of the valve AW1. Fluid pressure may now pass from the conduit 15 to the valve AW1 as soon as the trip valve TV is momentarily opened near the completion of the single revolution of the plate 21, and thence by the conduit section 16 to the release devices WR1 and WR2 for the two tool devices or working units W1 and W2. These tool devices are thus released and accomplish their feeding and withdrawal movements at such a rate of feed as may have been selected. It is not necessary that they operate at the same speed nor that they return to withdrawn position at the same time. As soon as either one of these devices moves away from its retracted position, the stem 86 of the corresponding valve WV1 or WV2 (Fig. 4) is moved (as by the spring usually included in such valves) to close the corresponding valve, this movement being permitted by the clockwise revolution of shaft 80 during the feeding. Thus closure of either one or both of these valves prevents any further flow of fluid from supply conduit 10 through the conduit section 11 to the automatic valve AV or the hand valve HV, and hence no rotation or indexing of the work can occur while tooling operations are being performed thereon.

In the illustrated structure for the article of work shown in Figs. 9 and 10, the working unit W1 is assumed to have a spindle WS carrying a drill for forming the hole 105 roughly, while the tooling device W2 has two spindles WS, each of which carries a small drill for forming the holes 106. In the particular article of work, it is assumed that the holes 106 need only be roughly formed, while the position and dimensions of the holes 105 must be exact.

As soon as the tool devices W1 and W2 have completed their feeding movements, they are automatically retracted; and each one is provided with a means, shown in Fig. 4, for opening the corresponding valves WV1 or WV2 again when the tool has been fully retracted. For this purpose, the finger 81 engages with the operating member 82 and pulls the slider 83 toward the left in Fig. 4, so that its projection 89 engages the lever 87 and depresses the valve stem 86. As soon as both tool devices W1 and W2 have thus returned their spindles to retracted position, fluid may again flow from supply conduit 10 through the valves WV1, WV2, WV3 and WV4 to the automatic valve AV which is now being held open by the engagement of the larger portion of the cam 63 with the pin 70a, and thus pass by conduit 13 to the means which operates to energize, when so released, the shaft 20 to accomplish a further single revolution of the plate 21.

As before, the locating pin 41 is lowered, the rotating plate 23 is turned through 60 degrees along with the shaft 24 and the article of work X, and then locked again. During the revolution of the plate 21, the valve TV is opened momentarily near the end of the single revolution, thus allowing fluid to move through conduit 15. Upon the completion of the rotation of the plate 21, the valve TV is closed again. While valve TV is closed, no fluid can flow to any of the valves AW1, AW3 and AW4. Thus, the tool devices cannot be released while the work is being rotated or indexed.

During this second indexing operation, however, the lower cam 64 has been given a further indexing movement which has no immediate influence upon the illustrated system, as the pin 70 for the valve AW1 causes this valve to continue in open position. Thus the two drills of the tool device W2 now drill two holes 106 in the axial plane with the hole 105 which has previously been drilled by tool device W1 during the first operation, while the tool device W1 now drills a second hole 105 60 degrees removed from the first hole.

At the completion of the movement of the tool devices W1 and W2, they return as before and the valves WV1 and WV2 are again opened, so that fluid is again admitted through the automatic valve AV, and the shaft 20 accomplishes a further rotation or indexing of the work through 60 degrees. As before, the trip valve TV is momentarily opened near the completion of this movement and fluid is permitted to pass by conduit 15 to the valves AW1, AW3, AW4. During this third indexing, however, the cam 64 has moved a sufficient distance so that the pin 70 of valve AW3 is moved and this valve is opened. Hence the tool device W3 is now released so that the three devices W1, W2, W3 are released simultaneously and perform their proper functions. It will be noted that the tool device W3, which is assumed to have its spindle WS provided with a rough reamer, is not released until the proper hole 105 has been drilled in the work by the tool device W1 and the work thus prepared has been positioned ready for the operation of this rough reaming. The departure of the tool device W3 from fully retracted position causes a closing of the corresponding valve WV3 which is not reopened until this tool device W3 has been returned to retracted position. This results in the drilling of a third hole 105 at the tool device W1, the drilling of another pair of holes 106 at the tool device W2, and a rough reaming of the first drilled hole 105 at tool device W3.

When these operations have beeen completed and the corresponding tool devices returned to retracted position, the fluid pressure is transmitted from supply conduit 10 through the open valves WV1, WV2, WV3, WV4 as before to the open automatic valve AV, so that a further indexing of 60 degrees occurs as before. Near the completion of this movement, the trip valve TV is again opened and fluid admitted by conduit 15 to the valves AW1, AW3 and AW4. This fourth indexing operation, however, has turned the cam 64 so that all three pins 70 effect opening of their corresponding valves AW1, AW3 and AW4, and now all four tool devices W1, W2, W3, W4 operate, each producing its intended tooling operation at a different part of the article of work, and again these devices are not released until the necessary preparatory operations have been performed at the corresponding point of the article of work. Thus, the rough reaming at tool device W3 does not occur until a prior drilling has been accomplished at tool device W1, nor is the finished reaming at tool device W4 accomplished until the rough reaming at tool device W3 has been completed.

At the completion of these individual operations and the return of the corresponding tool devices to retracted position, a fifth indexing occurs and all four devices again operate: this is followed in turn by a sixth indexing and corresponding operation of all four devices.

At this time, all six holes 105 have been rough-drilled, all six pairs of holes 106 have been drilled, four of the holes 105 have been rough-reamed, and three of these have been finished-reamed. Any operation of drilling at tool devices W1 and W2 therefore merely repeats an operation which has already been performed, and if there be any defect in the tool or if any accumulation of chips or otherwise be present, it is possible that the corresponding drills may injure the work which has already been finished-reamed.

At the completion of the tooling operations following this sixth indexing movement, the conduits and valves are opened as before and a seventh indexing movement of 60 degrees is accomplished. This movement, however, results in a departure of the raised or larger-radius portion of the cam 64 from opposite the pin 70 of the valve AW1, and this valve now closes. Hence when the fluid pressure is next admitted through the trip valve TV and conduit 15, the fluid does not gain passage at valve AW1 to the tool devices W1 and W2, and these devices are thus prevented from a tooling operation at this seventh position. The valves AW3 and AW4, however, are still open so that the tool devices W3 and W4 perform their intended operations. An eighth indexing is now accomplished in the aforesaid manner, and the movement of the cam 64 brings it to a position at which the valve AW1 is closed but the valves AW3 and AW4 are still open, so that the tool devices W3 and W4 again operate to rough-ream and finish-ream corresponding points of the article of work. A ninth rotating or indexing operation is now accomplished at which the cam 64 has now moved a sufficient angular distance so that the pin 70 of the valve AW3 is released for the closing of this valve. Near the completion of this indexing, therefore, the passage of fluid from trip valve TV and conduit 15 may only find a path through the open valve AW4 to release the tool device W4, while the tool devices W1, W2 and W3 are held against movement. At the completion of this movement, the tool device W4 returns to retracted position and releases the parts for the final indexing movement.

In this final or tenth indexing, in this illustrated device, the cam 64 now releases the pin 70 of the valve AW4 so that this valve closes. Thus the completion of the single revolution of the plate 21 for this tenth indexing movement and the accompanying opening of the trip valve TV does not permit release of any other tool devices. Simultaneously with the movement of the final pin 70, however, the cam 63 has presented its notch 63a opposite the pin 70a so that this pin now moves and the valve AV closes, and no further automatic energization of the turret or work holder structure is possible.

The parts have now returned to the initial position and the operator can remove the cap 30, lift off the article of work X, and replace it by a new blank.

It is obvious that many changes may be made in the illustrated form of assemblage: for particular articles of work pins 26 and cap members 30 may be constructed of any desired type; the support 56 for the fixture bushings may be varied according to the requirements of the operation; and the work may be operated on in many ways according to the necessities of the particular case. Thus the invention may be practiced in many ways within the scope of the appended claims.

I claim:

1. In a machine tool, a plurality of tool devices for successive operation upon an article of work requiring a plurality of operations by each tool device, each tool device including feeding and feed restraining means, and work presenting and tool device releasing means for successively presenting the work to the tool devices for the completion thereof and including elements operating selectively for preventing the releasing and for releasing said restraining means in each position of the article of work whereby to prevent the operation of a tool device until the work has been prepared for its operation.

2. A machine tool as in claim 1, in which the said elements include parts operative for preventing the operation of a tool device when the corresponding operation has already been performed upon the corresponding portion of the work.

3. In a machine tool, a plurality of tool devices for successive operation upon an article of work requiring a plurality of operations by each tool device, each tool device including feeding and feed restraining means, a turret structure for supporting the work and successively presenting portions thereof to the tool devices, said tool devices being located at intervals equivalent to the movements of presentation by said turret structure so that a plurality of said devices can operate simultaneously in performing successive operations upon successively presented portions of the article of work, and tool device detaining and releasing means actuated with the turret structure for selectively releasing said restraining means in each position of the article of work and operating to prevent the operation of a tool device until the work has been prepared for its operation.

4. In a machine tool, a plurality of tool devices for successive operation upon an article of work requiring a plurality of operations by each tool device and the operation of at least two said tool devices in a definite succession, each tool device including feeding and feed restraining means, a work support for successively presenting the articles of work for the successive operations thereon, and means actuated with the work support operating selectively for preventing the releasing and for releasing the feed restraining means whereby an initial tool device is caused to operate immediately upon the presented work to start a cycle and a succeeding tool device is released only when the presented work has been prepared therefor and whereby said initial tool device is not released when the presented work has already had the initial operation performed thereon.

5. A machine tool as in claim 4, including power means for advancing the work support, and devices actuated by the tool devices for effecting such advancement when the tool devices are in withdrawn position.

6. A machine tool as in claim 4, including power means for advancing the work support, devices actuated by the tool devices for effecting such advancement when the tool devices are in withdrawn position, and means included in said actuated means for stopping further advancement of the work support when a cycle is completed.

EDWARD JOSLIN KINGSBURY.